United States Patent [19]
Tanioka

[11] Patent Number: 5,301,039
[45] Date of Patent: Apr. 5, 1994

[54] IMAGE PROCESSING APPARATUS WITH PIXEL TONE DISCRIMINATION

[75] Inventor: Hiroshi Tanioka, Tokyo, Japan

[73] Assignee: Canon Kabushiki Kaisha, Tokyo, Japan

[21] Appl. No.: 73,982

[22] Filed: Jun. 8, 1993

Related U.S. Application Data

[63] Continuation of Ser. No. 662,503, Feb. 28, 1991, abandoned, which is a continuation of Ser. No. 332,384, Apr. 3, 1989, abandoned, which is a continuation of Ser. No. 819,132, Jan. 15, 1986, abandoned.

[30] Foreign Application Priority Data

Jan. 21, 1985 [JP] Japan .................. 60-8915
Jan. 21, 1985 [JP] Japan .................. 60-8916

[51] Int. Cl.⁵ .................. H04N 1/40; G06F 15/68
[52] U.S. Cl. .................. 358/457; 355/326 R; 358/455; 358/456
[58] Field of Search .................. 355/214, 326, 327; 358/448, 455, 456, 457, 75, 78, 79

[56] References Cited

U.S. PATENT DOCUMENTS

| | | | |
|---|---|---|---|
| 4,229,095 | 10/1980 | Mir | 355/35 |
| 4,279,035 | 3/1988 | Tanioka | 358/282 |
| 4,371,892 | 2/1983 | Mir | 358/75 |
| 4,375,647 | 3/1983 | Mir | 358/75 |
| 4,378,568 | 3/1983 | Mir | 358/75 |
| 4,414,581 | 11/1983 | Kato et al. | 358/280 |
| 4,547,811 | 10/1985 | Ochi et al. | 358/280 |
| 4,562,486 | 12/1985 | Suzuki et al. | 358/282 |
| 4,642,681 | 2/1987 | Ikeda | 358/79 |
| 4,663,662 | 5/1987 | Sekizawa et al. | 358/280 X |
| 4,701,807 | 10/1987 | Ogino | 358/284 |
| 4,707,745 | 11/1987 | Sakano | 358/298 X |
| 4,723,173 | 2/1988 | Tanioka | 358/282 |
| 4,734,784 | 3/1988 | Tanaka | 358/456 X |
| 4,821,334 | 4/1989 | Ogino et al. | 358/457 X |
| 4,905,294 | 2/1990 | Sugiura et al. | 358/456 |

FOREIGN PATENT DOCUMENTS 61-125683 6/1986 Japan .

Primary Examiner—Fred L. Braun
Attorney, Agent, or Firm—Fitzpatrick, Cella, Harper & Scinto

[57] ABSTRACT

An image processing apparatus has elements for inputting pixel data and for processing the input pixel data. The processing element includes a device for quantizing the input pixel data to produce binary data, and a memory device for receiving the binary data as an address to produce an output indicating image tone of the input pixel data. Preferably, the memory receives as one address a plurality of binary data, corresponding to a plurality of input pixel data. A delay element can be included to enable the memory to receive the plurality of binary data at a single time. In particular, the pixel data tonality can be discriminated by using one or more high-order bits of input multi-bit pixel data.

22 Claims, 5 Drawing Sheets

IMAGE PROCESSING APPARATUS WITH PIXEL TONE DISCRIMINATION

This application is a continuation of application Ser. No. 07/662,503 filed Feb. 28, 1991, now abandoned which is a continuation of application Ser. No. 07/332,384, filed Apr. 3, 1989, now abandoned which is a continuation of application Ser. No. 06/819,132 filed Jan. 15, 1986, now abandoned.

BACKGROUND OF THE INVENTION

1. Field of the Invention

The present invention relates to an image processing apparatus having an image discrimination function which is suitable for use as or in a copying machine, facsimile machine, reader or electronic file.

2. Description of the Prior Art

An apparatus for discriminating a tonality (property or characteristic of image) of a pixel under consideration by utilizing a density difference in the vicinity of the pixel under consideration, and an apparatus which divides one screen of input pixels into 4×4-pixel areas (blocks) and discriminates the tonality block by block, have been known. The former requires 6-bit operations and the latter requires two-dimensional complex operation. Accordingly, they are complex in construction and expensive.

SUMMARY OF THE INVENTION

It is an object of the present invention to remove the above-mentioned drawbacks.

It is another object of the present invention to provide an image processing apparatus having an image discrimination function, which is simple in construction and inexpensive.

It is another object of the present invention to provide an image processing apparatus which produces a high quality of image.

It is another object of the present invention to provide an image processing apparatus which can exactly reproduce an original image.

It is another object of the present invention to provide an improved image processing apparatus having an image discrimination function.

It is another object of the present invention to provide an image processing apparatus which can exactly discriminate an image.

It is still another object of the present invention to provide an image processing apparatus having an image discrimination function which can process an image at a high speed.

It is a further object of the present invention to provide an image processing apparatus which can reproduce a high quality image with a simple construction.

According to the present invention, these objects are attained by providing an apparatus for discriminating the image tone, or nature, of an image, according to one aspect of the invention, by applying digitized image data to a memory as address data and reading out from the memory an indication of the image tone. According to a second aspect of the invention, the image data used as address data includes data pertaining not only to a pixel under consideration but also to pixels adjacent to that under consideration. According to a third aspect of the invention, a discrimination of image tone or nature is conducted on the basis of n upper bits of m-bit image data, where m is greater than n.

Other objects, features and advantage of the present invention will be more fully apparent from the following description of the preferred embodiments, taken in conjunction with the accompanying drawings.

DESCRIPTION OF THE PREFERRED EMBODIMENTS

Figure 1:
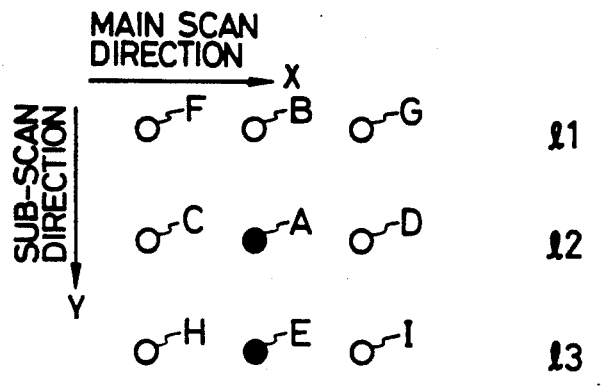
FIG. 1 illustrates a method for discriminating an image in accordance with one embodiment of the present invention.

FIG. 1 shows binary status of nine pixels including a pixel A (at the center) and peripheral pixels. A black pixel is represented by ● and a white pixel is represented by ○. A method for discriminating an image in accordance with one embodiment of the present invention is explained with reference to FIG. 1.

In the present embodiment, whether the pixel A under consideration is an edge of a line image such as a character or not is discriminated by the number of white or black pixels in the five pixels consisting of the pixel A under consideration and four peripheral pixels (B–E) in the digitized, specifically, binary-coded or binarized (herein, the terms "binarize", "binarized" and "binarization" are used as convenient terminology to refer to a process of converting image data into binary data, i.e., binary coding), image.

For example, when all of the pixel A under consideration and the peripheral pixels B–E are white or black, the pixel A under consideration is determined not to be the edge of a character, and in other cases, it is determined to be the edge of a character.

If the character is sharply binarized at the edge thereof in a one-dimensional direction even for one or two pixels, the quality of the reproduced character is significantly improved even if the character is dither-processed (subjected to gray level processing), although the edge must be two-dimensionally binarized.

In the present embodiment, the edge of the character is two-dimensionally discriminated by using the discrimination method described above to reproduce a high quality of character.

Figure 2:
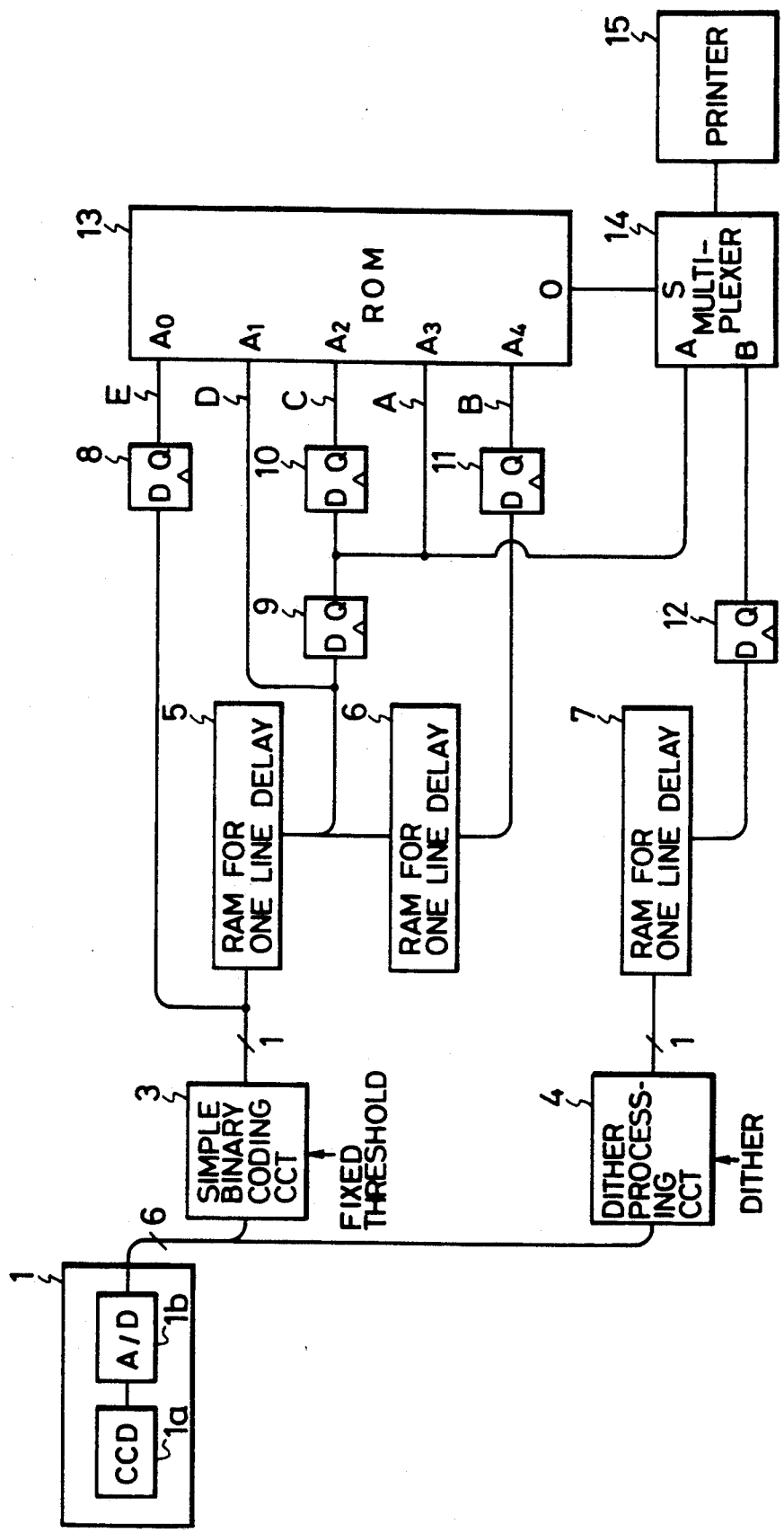
FIG. 2 shows one embodiment of an image processing apparatus according to the present invention.

FIG. 2 shows an embodiment of the image processing apparatus which binarizes an image data and discriminates the image.

Numerals above lines indicate the numbers of bits of image data to be transported by the line in question. Numeral 1 denotes a document reader having a solid-state imaging device (sensor) 1a such as a CCD and an A/D converter 16 which quantizes an output from the sensor 1a to form 6-bit image data. The document reader 1 has a line sensor and electrically scans the document in a line direction (main scan direction), and mechanically scans the document in a direction normal to the line direction (i.e., in a sub-scan direction) to read the entire document. Numeral 3 denotes a simple binarization circuit which compares sequentially inputted 6-bit pixel data with a predetermined threshold (fixed threshold) to produce binary signals "1" and "0". In the present embodiment, the image is discriminated in accordance with the binary data from the simple binarization circuit 3. The simple binarization circuit 3 sequentially produces the binary signals along the main scan direction X, and as the scan for the first line 11 is completed, the second line 12 is scanned. Numeral 4 denotes a dither processor which compares the sequentially inputted 6-bit pixel data with thresholds of a predetermined dither matrix to produce dither-processed binary data. The dither processor and the simple binarization circuit 3 are operated in parallel. Numerals 5 and 6 denote one-line delay RAM's for delaying the binary signal from the simple binarization circuit 3 by one line in the sub-scan direction, and numeral 7 denotes a one-line delay RAM for delaying the binary signal from the dither processor 4 by one line. Numerals 8-12 denote delayed flip-flops (D-F/F) which delay the binary outputs from the delay RAM's by one pixel in the main scan direction.

The pixels A-E shown in FIG. 1 can be simultaneously detected by the circuit of FIG. 2. Assuming that the pixel E is outputted from the D-F/F 8, then the pixel D is outputted from the one-line delay RAM 5, the pixel A under consideration is outputted from the D-F/F 9 which delays the output of the RAM 5 by one pixel, the pixel C is outputted from the D-F/F 10 which further delays the output of the D-F/F 9 by one pixel, and the pixel B is outputted from the D-F/F 11 which further delays the output of the RAM 6 by one pixel. The pixel data A-E simultaneously detected by the above arrangement are supplied to address terminals A0-A4 of a ROM 13. The ROM 13 contains "0"s and "1"s for the respective addresses so that whether the pixel A under consideration is the edge of the character or not is determined.

For example, when the data supplied to the addresses A0-A4 are all "0"s or all "1"s, it is determined not to be the edge of the character, and in other cases, it is determined to be the edge. In this case, "0"s are stored at addresses 00H ("H" represents "hexadecimal") and 1FH and "1"s are stored at other addresses. The output "1" from the ROM 13 indicates that the pixel under consideration is determined to be the edge of the character, and the output "0" indicates that it is determined not to be the edge.

When the output of the ROM 13 is "1", a signal "1" is supplied to a select terminal S of a multi-plexor 14 so that an input terminal A thereof, that is, the pixel under consideration binarized with the fixed threshold, is selected and supplied to a printer 15, which may be a well-known binary printer such as a laser beam printer and forms dots in accordance with input binary data to record an image. On the other hand, when the output of the ROM 13 is "0", an input terminal B is selected, so that the dither-processed binary signal is selected. The delay RAM 7 and the D-F/F 12 are used to synchronize the output timing of the discrimination result and the pixel under consideration.

Figure 3:
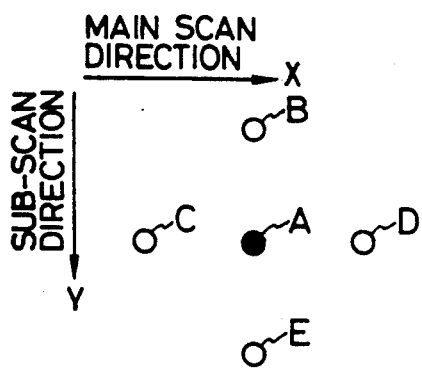
FIGS. 3 and 4 illustrate other discrimination methods.

In this manner, the tonality can be discriminated pixel by pixel on a real time basis and the image can be binarized. In the present embodiment, the binary data is supplied to the ROM as the address and the ROM outputs the discrimination result. Accordingly, the scale of the circuit may be small; various algorithms other than the discrimination method described above can be applied. For example, as shown in FIG. 3, when only the pixel A under consideration is black and all of the peripheral pixels B-E are white, the black of the pixel A under consideration is determined to be a noise component and a dither-processed pixel A under consideration is selected. In this manner, the pixel under consideration can be discriminated by a positional relation between the black pixels and the white pixels.

A gray level area may be misdetermined to be the edge of the character. In the present embodiment, since the tonality is two-dimensionally discriminated pixel by pixel, an error which appears in a line of one to two pixels is not an obstacle to proper performance of the apparatus, because the periphery thereof is dither-processed. The errors can be reduced by appropriately selecting a discrimination level, such that, for example, the dither-processing is carried out when at least four of the five pixels including the pixel under consideration are "0" or at least four out of the five are "1".

Figure 4:
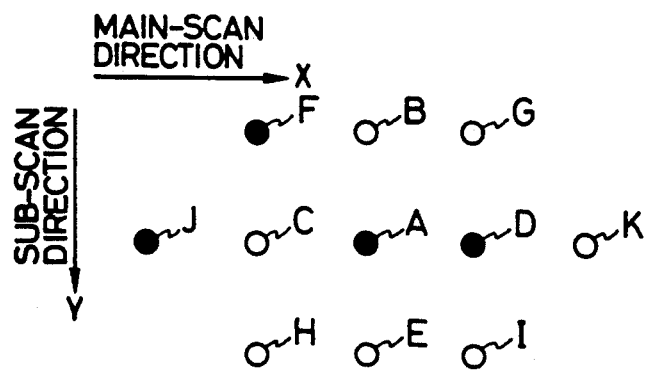

Alternatively, the four pixels adjacent to the pixel A under consideration and considered therewith may be those which are on diagonal lines as shown by F-I in FIG. 1. If the ROM has a sufficiently large capacity, eight adjacent pixels B-I shown in FIG. 1 may be used for the discrimination. The pixel A under consideration and the adjacent pixels B, E, J and K shown in FIG. 4 may be used to discriminate the tonality of the pixel under consideration. The simple binarization circuit 3 and the dither processor 4 may use not comparators but ROMs, and the 6-bit image data may be directly applied thereto as the addresses to output "1" and "0" discrimination results from the ROMs.

Figure 5:
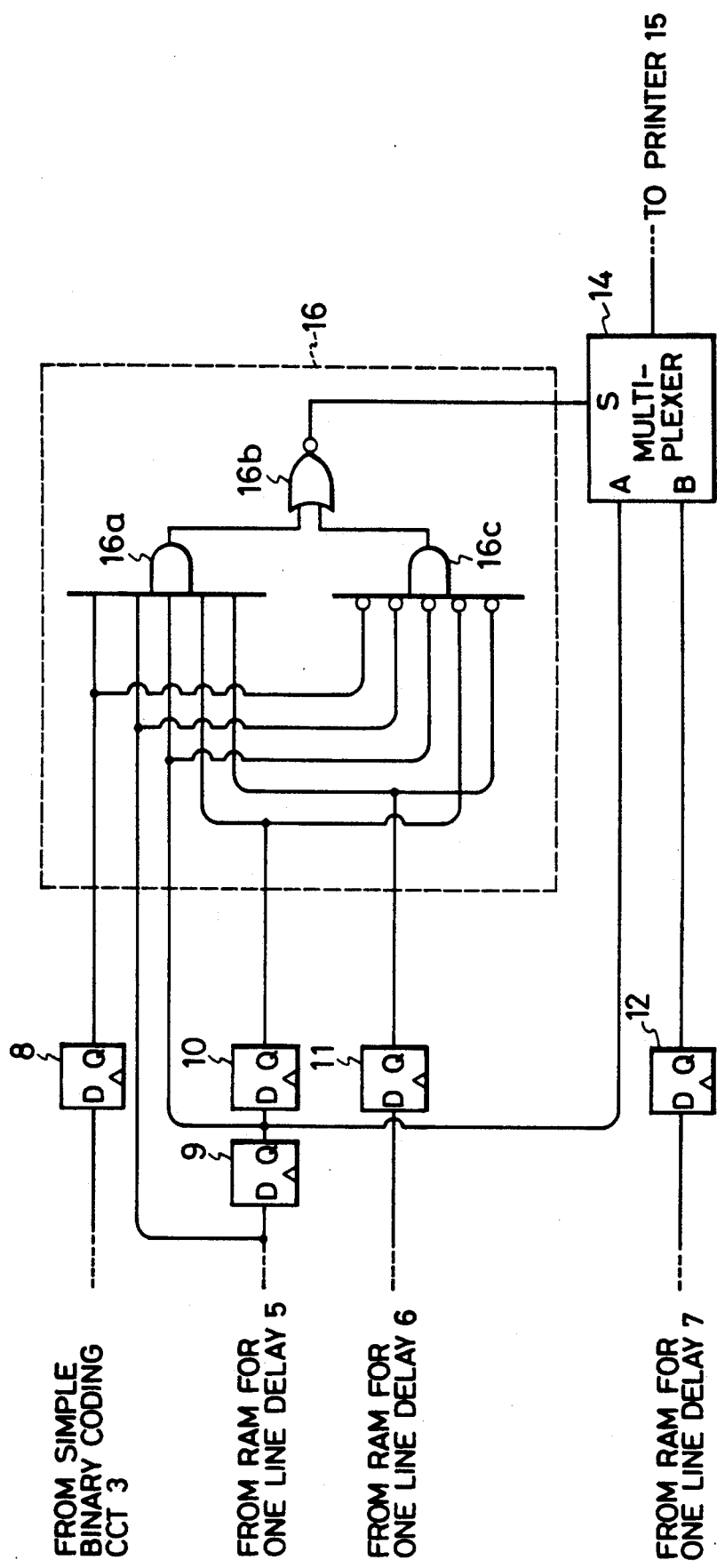
FIG. 5 shows a modification of the circuit of FIG. 2.

FIG. 5 shows a modification of the circuit of FIG. 2. The elements like to those shown in FIG. 2 are designated by the like numerals, and the explanation thereof is omitted. A portion not shown in FIG. 5 is similar to the corresponding portion of FIG. 2. The circuit of FIG. 5 is used when the discrimination algorithm for the pixel under consideration is relatively simple. As explained in connection with FIGS. 1 and 2, when all of the pixel A under consideration and the adjacent pixels B-E are white or black, the pixel A under consideration is determined not to be the edge of the character. Numeral 16 denotes a gate circuit or a programmable array, numeral 16a denotes an AND circuit and numerals 16b and 16c denote NOR circuits. The main operation of the circuit of FIG. 5 is similar to that of FIG. 2 and the explanation thereof is omitted here.

A second embodiment of the present invention is now explained.

Figure 6:
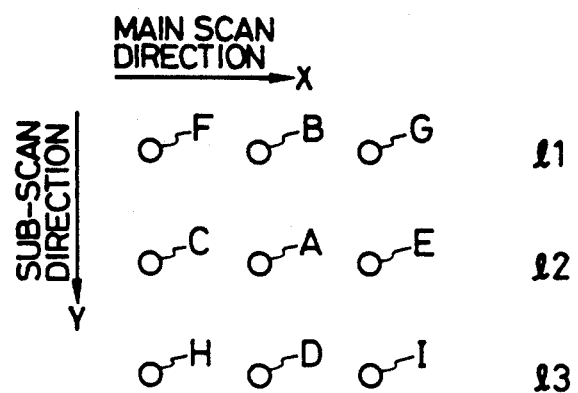
FIG. 6 illustrates a method for discriminating an image in accordance with a second embodiment.

FIG. 6 shows four pixels including a pixel A under consideration and its peripheral pixels. A method for discriminating the image in accordance with the second embodiment is explained with reference to FIG. 6. In the second embodiment, the tonality is discriminated pixel by pixel by using two high order bits of the quatized 6-bit image data. A maximum density L max and a minimum density L min are determined for the set of pixels consisting of the pixel A under consideration and the adjacent pixels B, C, D and E, to determine a density gradient $\Delta L$.

If $\Delta L = L\,max - L\,min \geq 2$     (1)

($\Delta L = 2$ or 3), the pixel under consideration belongs to an edge of a line image such as a character.

If $\Delta L = L\ max - L\ min < 2$     (2)

($\Delta L = 0$ or 1), the pixel under consideration belongs to a gray level area of a photograph.

When the pixel under consideration is determined to be the edge of a character, the pixel under consideration is binarized using a fixed threshold, and when the pixel under consideration is determined to be the gray level area of the photograph, the pixel under consideration is binarized using dither processing.

As described above, if the edge of the character is sharply binarized in a one-dimensional direction even for one or two pixels, the quality of the reproduced character is significantly improved even if the character is dither-processed (gray level processing), although the edge has to be two-dimensionally processed.

In the second embodiments, the above discrimination method is used to two-dimensionally identify the edge of characters to reproduce a high quality of character.

Figure 7:
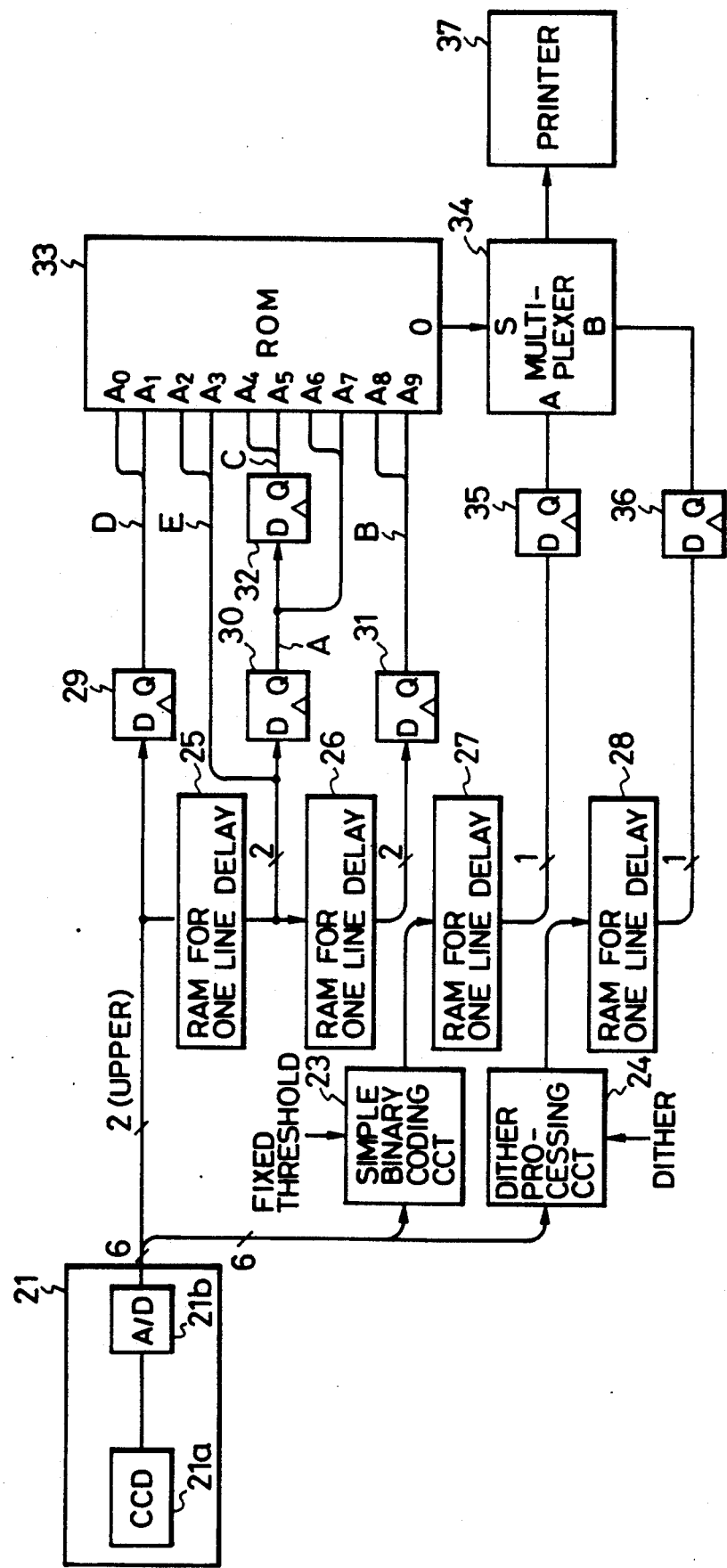
FIG. 7 shows a second embodiment of image processing apparatus according to the invention.

FIG. 7 shows the circuit of the second embodiment of the image processing apparatus, which binarizes the image data and carries out the discrimination described above. Numerals above lines indicate the numbers of bits of image data carried by those lines. Numeral 21 denotes a document reader including a solid-state imaging device (sensor) 21a such as a CCD and an A/D converter 21b for quantizing an output of the sensor 21a to form 6-bit pixel data. The document reader 21 has a line sensor and electrically scans the document in a line direction (the main scan direction) and mechanically scans the document normally to the line direction (the sub-scan direction) to read the entire document. Numeral 23 denotes a simple binarization circuit which compares sequentially inputted 6-bit pixel data with a predetermined threshold (fixed threshold) to produce binary signals "1" and "0". In the present embodiment, the simple binarization circuit 23 sequentially produces the binary signals along the main scan direction X, and as the scan for the first line 11 is completed, the second line 12 is scanned. Numeral 24 denotes a dither processor which compares the sequentially inputted 6-bit pixel data with thresholds of a predetermined dither matrix to produce dither-processed binary data. The dither processor and the simple binarization circuit are operated in parallel. Numeral 27 denotes a one-line delay RAM for delaying the binary signal from the simple binarization circuit 23 by one line in the sub-scan direciton, and numeral 28 denotes a one-line delay RAM for delaying the binary signal from the dither processor 24 by one line. Numerals 35 and 36 denote delayed flip-flops (D-F/F) which delay the binary outputs from the delay RAM's 27 and 28 by one pixel in the main scan direction.

Numerals 25 and 26 denote delay RAM's which receive two high order bits of the 6-bit pixel data supplied from the document reader 21 and delay then by one line in the sub-scan direction, and numerals 29-32 denote D-F/Fs which delay the 2-bit pixel data supplied from the document reader 21 and the delay RAMs 25 and 26 by one pixel in the main scan direction.

In the second embodiment, the discrimination circuit is constructed by the delay RAMs 25 and 26, the D-F/F's 29-32 and the ROM 33 to discriminate the tonality pixel by pixel. Assuming that the pixel D adjacent to the pixel A under consideration is outputted from the D-F/F 29, then the pixel E is outputted from the one-line delay RAM 25, the pixel A under consideration is outputted from the D-F/F 30 which delays the output of the RAM 25 by one pixel, the pixel C is outputted from the D-F/F 32 which further delays the output of the D-F/F 30 by one pixel, and the pixel B is outputted from the D-F/F 31 which further delays the output of the RAM 26 by one pixel. By this arrangement, the 2-bit density data for the pixel A under consideration and the adjacent pixels B, C, D and E can be simultaneously detected. Those pixel data A-E are supplied to address terminals A0-A9 of a ROM 33.

The ROM 33 contains "0"s and "1"s for the respective addresses so that whether the pixel A under consideration is the edge of the character or not is determined.

The ROM 33 has addresses which correspond to all cases in which the five pixels A-E changes within two bits (0-3), and "0" or "1" discrimination results for the respective addresses.

Thus, the ROM 33 carries out the processing corresponding to the operation of $L\ max - L\ min$ and the discrimination of the tonality in accordance with the operation result. In the second embodiment, the discrimination result is "1" when the pixel under consideration is determined to be the edge of the character, and the discrimination result is "0" when it is determined to be the gray level area.

When the output of the ROM 33 is "1", a signal "1" is supplied to a select terminal S of a multiplexor 34 so that an input terminal A thereof, that is, the pixel under consideration binarized with the fixed threshold is selected and supplied to a printer 37, which may be a well-known binary printer such as a laser beam printer and forms dots in accordance with input binary data to record an image. On the other hand, when the output of the ROM 33 is "0", an input terminal B is selected so that the dither-processed binary signal is selected. The delay RAMs 27 and 28 and the D-F/F's 35 and 36 are used to synchronize the output timing of the discrimination result and the pixel under consideration.

In this manner, the tonality can be discriminated pixel by pixel on real time basis and the image can be binarized. In the present embodiment, the two high order bits of the 6-bit pixel data are supplied to the ROM as the address and the ROM outputs the discrimination result. Accordingly, the scale of the circuit may be small. Again various algorithms other than the discrimination method described above can be applied. For example, if the pixel under consideration has a maximum or minimum density, it may be determined to be the gray level area even if the density difference $\Delta L$ is 2 or 3. In this manner, by considering the positional relation of the maximum and minimum densities, the image can be discriminated with a higher precision.

Figure 8:
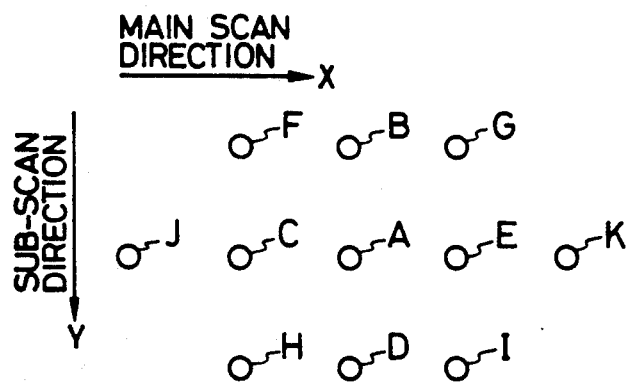
FIG. 8 shows another discrimination method.

Alternatively, four pixels adjacent to the pixel A under consideration may be set on diagonal lines as shown by F-I in FIG. 6. If the ROM has a sufficiently large capacity, eight adjacent pixels B-I shown in FIG. 6 may be used for the discrimination. The pixel A under consideration and the adjacent pixels B, E, J and K shown in FIG. 8 may be used to discriminate the tonality of the pixel under consideration. The simple binarization circuit 23 and the dither processor 24 may use, not comparators, but ROMs, and the 6-bit image data may be directly applied thereto as addresses to output the results.

The present invention is not limited to the illustrated embodiments but various modifications thereof may be made within the scope of the appended claims.

I claim:

1. An image processing apparatus comprising:
   pixel data input means for inputting pixel data quantized by m bits; and
   processing means for processing the m-bit pixel data inputted by said input means;
   said processing means including discrimination means for discriminating a characteristic of an image represented by said pixel data by using n upper bits of said m-bit pixel data, n being greater than or equal to two, and m being greater than n.

2. An image processing apparatus comprising:
   pixel data input means for inputting pixel data quantized by m bits; and
   processing means for processing the m-bit pixel data inputted by said input means;
   said processing means including discrimination means for discriminating a characteristic of an image represented by said pixel data by using n high order bits of said m-bit pixel data, n being greater than one, and m being greater than n.

3. An image processing apparatus according to claim 2 wherein said discrimination means includes memory means for receiving the n-bit pixel data as an address to output a discrimination result for the tonality of the pixel data.

4. An image processing apparatus according to claim 3 wherein said memory means receives the n-bit pixel data under consideration and the n-bit pixel data for pixels adjacent to the pixel under consideration as the address and outputs the discrimination result for the tonality of the pixel data under consideration.

5. An image processing apparatus according to claim 4 further comprising first digitization means for digitizing the input m-bit pixel data using a predetermined threshold and second digitization means for gray-level processing the input m-bit pixel data, wherein said processing means includes means for selecting one of binary data outputted from said first digitization means and binary data outputted from said second digitization means in accordance with the discrimination result outputted from said memory means.

6. An apparatus according to claim 4 wherein said memory means discriminates whether a pixel under consideration is half-tone image or not, for each pixel.

7. An image processing apparatus according to claim 2, further comprising halftone processing means for halftone processing the m-bit pixel data input through said input means, and delay means of adjusting a timing between an output from said halftone processing means and an output from said discrimination means.

8. An image processing apparatus comprising:
   pixel data input means;
   processing means for processing pixel data inputted by said input means;
   said processing means including memory means for receiving as an address data for a pixel under consideration and data for pixels adjacent to the pixel under consideration, inputted by said input means, and for outputting a discrimination result indicating a tonality of the pixel data under consideration; and
   means for delaying pixel data corresponding to the pixel under consideration and pixel data corresponding to a pixel adjacent to the pixel under consideration so that said memory means receives these pixel data at the same time,
   wherein said memory means stores a relation between the input pixel data and the discrimination result.

9. An image processing apparatus according to claim 8, wherein said pixel data input means inputs m-bit pixel data, and said memory means receives as an address n (m>n) high order bits of the m-bit pixel data and outputs the discrimination result.

10. An image processing apparatus according to claim 8, wherein said processing means further comprises halftone processing means for halftone processing the pixel data inputted from said pixel data input means, non-halftone processing means for non-halftone processing the pixel data, and select means for selecting one of an output from said halftone processing means and an output from said non-halftone processing means, in accordance with the discrimination result outputted from said memory means.

11. An image processing apparatus according to claim 10, wherein said halftone processing means includes dither processing means for performing dither processing of the input pixel data.

12. An image processing apparatus according to claim 10, wherein said non-halftone processing means includes digitization means for digitizing said input pixel data using a fixed threshold to produce binary data.

13. An apparatus according to claim 10, wherein said memory means discriminates whether the pixel data consideration is a half-tone image or not, for each pixel.

14. An image processing apparatus comprising:
    pixel data input means;
    processing means for processing the pixel data inputted by said input means; and processing means including digitization means for digitizing the input pixel data to produce binary data, and memory means for receiving the binary data as an address for producing a discrimination result indicating an image tone of the input pixel data;
    means for delaying binary data corresponding to a pixel under consideration and binary data corresponding to pixels adjacent to the pixel under consideration so that said memory means receives these binary data at the same time,
    wherein said memory means receives, as the address, data for a pixel under consideration and data for pixels adjacent to the pixel under consideration, digitized by said digitization means, and outputs the discrimination result indicating the image tone for the pixel under consideration, and said memory means stores a relation between the input pixel data and the discrimination result.

15. An image processing apparatus according to claim 14, wherein said digitization means digitizes the input pixel data using a fixed threshold.

16. An image processing apparatus according to claim 14, wherein said processing means includes means for switching an output mode for the pixel data under consideration in accordance with the discrimination result outputted from said memory means.

17. An image processing apparatus according to claim 14, wherein said processing means includes gray-level processing means for gray-level processing said input pixel data to produce binary data.

18. An image processing apparatus according to claim 17, wherein said processing means includes select means for selecting one of the binary data outputted from said digitization means and binary data outputted from said gray level processing means in accordance with the discrimination result outputted from said memory means.

19. An image processing apparatus according to claim 18, further including print means for reproducing an image in accordance with the binary data outputted from said select means.

20. An apparatus according to claim 18, wherein said digitization means and said gray-level processing means each comprises a respective memory receiving input pixel data as an address to output binary data.

21. An apparatus according to claim 14, wherein said memory means discriminates whether a pixel under consideration is an edge portion of an image or not, for each pixel.

22. An image processing apparatus comprising:
pixel data input means for inputting pixel data quantized by n bits;
processing means for processing n-bit pixel data inputted by said input means; said processing means including digitization means for digitizing the input n-bit pixel data to produce binary data using a fixed threshold, gray-level processing means for gray-level processing the input n-bit pixel data to produce binary data, memory means for receiving the binary data as an address for producing a discrimination result indicating an image tone of the input pixel data, and select means for selecting one of the binary data outputted from said digitization means and the binary data outputted from said gray-level processing means in accordance with the discrimination result outputted from said memory means;
means for delaying the n-bit pixel data under consideration and n-bit pixel data for a pixel adjacent to the pixel under consideration so that said memory means receives these n-bit pixel data at the same time,
wherein said digitization means and said gray-level processing means each comprise a respective memory receiving input n-bit pixel data as an address to output binary data and said memory means stores a relation between the input pixel data and the discrimination result.

* * * * *

UNITED STATES PATENT AND TRADEMARK OFFICE
CERTIFICATE OF CORRECTION

PATENT NO. : 5,301,039
DATED : April 5, 1994
INVENTOR(S) : HIROSHI TANIOKA

It is certified that error appears in the above-identified patent and that said Letters Patent is hereby corrected as shown below:

On the title page:

AT [56] REFERENCES CITED

U.S. Patent Documents,
"4,279,035  3/1988  Tanioka" should read
--4,729,035  3/1988  Tanioka--.

COLUMN 1

Line 26, "two-dimensional" should read
--two-dimensional,--.

COLUMN 2

Line 61, "A/D converter 16" should read
--A/D converter 1b--.

COLUMN 5

Line 33, "direction)" should read --direction),--.
Line 57, "then" should read --them--.

UNITED STATES PATENT AND TRADEMARK OFFICE
CERTIFICATE OF CORRECTION

PATENT NO. : 5,301,039
DATED : April 5, 1994
INVENTOR(S) : HIROSHI TANIOKA

It is certified that error appears in the above-identified patent and that said Letters Patent is hereby corrected as shown below:

COLUMN 6

```
Line 15, "changes" should read --change--.
Line 40, "real" should read --a real--.
Line 45, "Again" should read --Again,--.
```

Signed and Sealed this

Thirteenth Day of December, 1994

Attest:

BRUCE LEHMAN

Attesting Officer     Commissioner of Patents and Trademarks